Patented May 15, 1928.

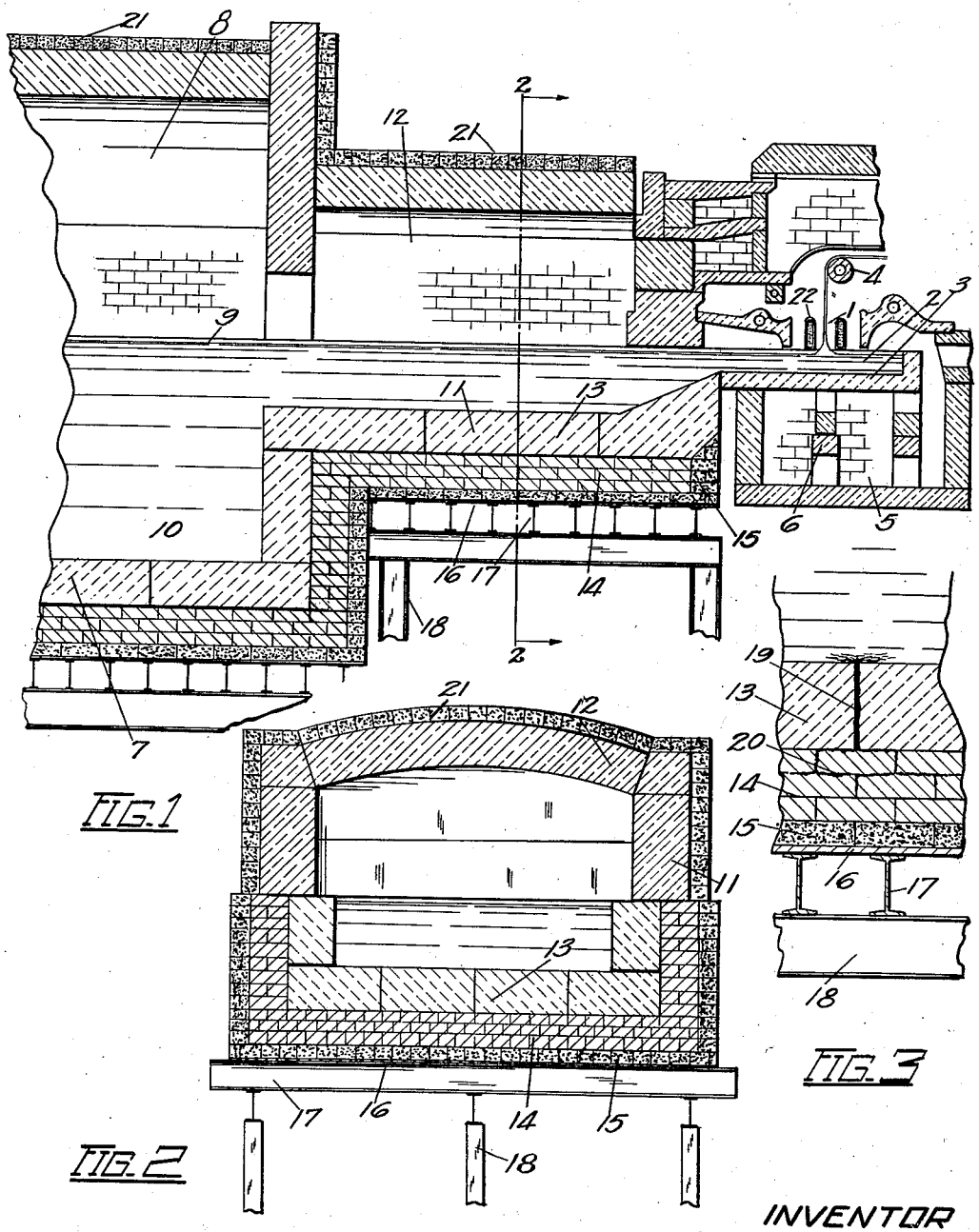

1,670,098

UNITED STATES PATENT OFFICE.

WILLIAM K. BROWNLEE, OF TOLEDO, OHIO, ASSIGNOR TO THE LIBBEY-OWENS SHEET GLASS COMPANY, OF TOLEDO, OHIO, A CORPORATION OF OHIO.

CONTINUOUS TANK FURNACE.

Application filed March 29, 1924. Serial No. 702,751.

This invention relates to glass tank construction, and more particularly to improvements in the furnace used for producing and delivering molten glass to a sheet glass drawing machine.

In the standard form of glass furnace construction, the walls of the tank for holding the molten glass are formed of rows of rather thick refractory fire-clay blocks laid closely adjacent one another. No binding material is used other than the molten glass which flows partly through the cracks between the blocks and freezes therein as it encounters the colder outer portions of the blocks. These outer surfaces are cooled by radiation to the outer air, or conduction to artificial heat-absorbing means such as cold air blasts or water-cooled shields. The material of these blocks has a relatively high thermal-conductivity, and it is necessary to make the blocks of considerable thickness to maintain the necessary temperature difference between the inner and outer surfaces. This great difference in temperature between the two sides of the blocks when in use, causes unequal expansion and contraction, often leading to cracks or splits in the blocks. During the process of manufacture the blocks are baked or burnt, but the high temperature to which these blocks are submitted during this treatment is often not as great as that to which they are subjected when in actual use in the glass tank. This higher temperature causes further shrinkage of the inner portions of the blocks and hence is another cause of breakage. The tank blocks would be more economical, more efficient, and longer lived if made smaller and subjected to less temperature variation between the inner and outer surfaces when in use. Smaller blocks are easier to manufacture and hence less expensive, and the smaller blocks can be burned harder and thus offer more resistance to the corrosive action of the molten glass. However, if such small blocks are used and insulating material is used against their outer walls to hold in the heat, the molten glass will immediately flow through the crevices between the blocks to the outer surface and attack the insulating material, which can offer little effective resistance to the molten metal.

According to the principles of the present invention, the inner wall of the tank is constructed of relatively small fire-clay blocks, which can be burnt very hard and offer the maximum resistance to the chemical action of the molten glass. This tank wall is surrounded by a plurality of rows of fire brick which may be laid very closely together, with broken joints so as to provide extremely narrow and tortuous passages for the molten glass which seeps through between the tank blocks. This intermediate wall of fire brick has no great insulating value but acts as a baffle wall to stop the outflow of molten glass. This wall will be somewhat cooler than the inner tank block wall, and the thin streams of molten glass which find their way into the narrow broken passages between the bricks will fill these cracks and freeze therein and seal the wall, before any glass can reach the outer soft insulating wall. This outer insulating wall is formed of bricks having high insulating properties, but no great strength, and will be reinforced by an outer metallic plate resting on suitable supports.

With this construction the inner wall of the tank blocks can be formed of the most effective and economical size of blocks, and can be operated under the most effective temperature conditions. These blocks will be subjected to a relatively higher temperature throughout than in prior constructions, but heat is not the only destroying agent for these blocks, and the more serious chemical corrosive effect of the molten glass will be given greater resistance by the harder finish of these smaller blocks. The intermediate fire brick wall acts as an effective baffle for the molten glass that seeps between the hot tank blocks, and the outer insulating wall is protected from the molten glass, and acts to hold in the heat that would otherwise be dissipated.

In certain sheet-glass producing installations now in use, such as shown for example in the patent to Colburn, 1,248,809, granted December 4, 1917, the glass sheet is drawn from a rather shallow receptacle or drawpot, closed at one end and in open communication at the other with a continuous tank furnace. The furnace comprises a long comparatively deep tank normally full of molten glass and glass-producing materials. At the melting end of this tank a series of gas flames play upon the surface of the molten mass of material. The glass producing batch and cullet are inserted at this end of the furnace and after being melted flow slowly through the furnace to the sheet-drawing machine. It is necessary for the molten glass to be refined or settled until it reaches the required state of plasticity and homogeneity before being drawn into glass sheets. The entire tank is enclosed so that the surface glass is always exposed to heated atmosphere, but usually no further heat is applied after the glass passes beyond the melting end of the tank. As the glass flows through the so-called "refining" end of the tank, the surface glass loses some heat but still retains a rather high temperature. In the form of tank disclosed in the Colburn patent referred to above, the glass flows through a smaller, so-called "cooling" chamber intermediate the refining tank and the draw-pot. This cooling tank, in which the refining and cooling process is continued is much shallower than the refining tank and the arched chamber above is lower.

While this molten glass is passing through the refining and cooling tanks, the lower strata of the glass loses a great deal of heat which is conducted and radiated away by the enclosing walls of the tanks. In this way the lower and side portions of the molten glass become cooler and stiffer and tend to stagnate so that the greater portion of the flow is confined to the surface glass. This limitation of the flow and the surface strata greatly decrease the producing capacity of the tank and consequently the rate at which sheet glass can be drawn therefrom. It is also objectionable to have semi-stagnant glass in the tank which loses its plasticity and tends to devitrify.

By constructing the tank walls according to the present invention, the molten glass will be maintained in a more homogeneous condition and of more nearly equal temperature from top to bottom, and the flow will be more uniform and not confined merely to the surface strata. The furnace lining will remain in a more serviceable condition and the heat losses, and hence the heating costs will be greatly reduced.

The invention will be more clearly understood from the following description and drawings of one approved form of tank construction.

In the accompanying drawings:

Fig. 1 is a vertical longitudinal section through the improved portion of the furnace and through the adjacent ends of the tank and glass-working machine.

Fig. 2 is a transverse vertical section taken substantially on the line 2—2 of Fig. 1.

Fig. 3 is a section, on an enlarged scale, through a portion of one of the lower tank walls.

As in the Colburn patent noted above, the glass sheet 1 is drawn upwardly from the molten glass 2 in the shallow receptacle or draw-pot 3, deflected over the cooled bending roll 4, and carried away through drawing and flattening mechanism, not shown, into the leer. All of this structure is well-known in the art and may be ascertained in detail from the Colburn patent noted above. A heating furnace 5 is located beneath the draw-pot 3 which is supported on suitable arches or stools 6 within the furnace. This furnace serves to keep the lower strata of the supply of molten glass 2 in the draw-pot at the proper working temperature.

At 7 is shown the delivery end of the refining tank which is merely a prolongation of the melting tank in which the glass-producing materials are reduced to molten glass. This refining tank 7 is enclosed by the chamber 8 which is a continuation of the melting chamber and confines a highly heated atmosphere above the surface of the molten glass. The surface glass 9 will cool somewhat but will be retained at a relatively high temperature by the heated atmosphere above. However, the lower strata 10 of the molten glass in this tank will ordinarily lose considerable heat which is conducted and radiated away by the walls of the tank 7.

From the refining tank 7 the molten glass flows through an intermediate shallow tank 11 to the draw-pot 3. This tank is enclosed by the lower arched housing 12, commonly known as the cooling chamber, although the temperature in this chamber is also quite hot since the chamber is in communication with the heated chamber 8. In prior constructions, the sides and bottom of this intermediate cooling tank 11 were exposed to the surrounding atmosphere and had quite a chilling effect upon the molten glass adjacent the walls and bottom of the tank. This construction so chills the bottom and edge portions of the shallow stream of molten glass flowing through tank 11, that only the upper strata flow freely, thus greatly diminishing the volume or depth of the molten glass delivered to the draw-pot 3.

In the improved furnace construction herein disclosed, the tank walls are built up of a series of distinct layers, which function in combination to retain both the molten glass and a large portion of the heat within the tank. The inner wall is formed of a layer of refractory tank blocks 13, which need not be particularly large or thick and can be burnt very hard to offer the maximum resistance to the heat and chemical action of the molten glass. Surrounding these tank blocks is an intermediate wall comprising several layers of fire brick 14. These brick may be laid quite close to one another and different layers are staggered so as to break joints and provide no continuous passage through this portion of the wall. Surrounding this is an outer layer of insulating material 15. An excellent material for this purpose is what is known as Silocel, whose basis is kieselguhr. This outer insulating wall 15 may be built up of Silocel bricks, which may be united if desired by cement of the same material. The insulating bricks are laid upon a steel plate 16 supported on I-beams 17 carried by the supporting framework 18.

The material forming the wall 15 has a very high insulating value, about 10 to 1 over that of the inner fire clay walls, and will retain a large portion of the heat within the tank. Since there is now little temperature loss between the inner and outer sides of the tank blocks 13, molten glass will seep through the cracks between the tank blocks as illustrated at 19, Fig. 3. When this molten glass encounters the layers of staggered fire-brick 14 it will attempt to pass through the narrow spaces between these brick, but these passages are so small and the pathway provided for the glass is so broken and tortuous that the glass will fill some of these cracks and freeze therein, as indicated at 20, and provide a practically solid baffle wall surrounding the tank blocks 13. If the fire clay wall 14 is of proper thickness none of the glass will ever reach the outer insulating wall 15.

Although the Silocel bricks forming the wall 15 have a very high insulating value they are soft and have no great strength, and for this reason they are reinforced by the outer steel plate 16. In this way the comparatively fragile insulating wall is strengthened by the outer steel plate 16, and protected from the corrosive action of the molten glass by the intermediate fire brick wall 14.

As here shown the intermediate cooling tank 11, and the refining tank 7, are provided with this improved type of wall, and this construction could even be used in the melting tank, although a heavier construction than here shown would be desirable to resist the more intense heat and more active glass at this point. The efficiency of the furnace may also be increased by covering the upper walls and arches of the heating chamber with an insulating layer of Silocel brick as indicated at 21.

With this improved construction the loss of heat from the lower strata of the molten glass will be greatly reduced. This will increase the fluidity of the lower strata, so that they will flow more freely, and as a result a deeper and more uniform flow of glass is constantly delivered to the draw-pot 3. With this deeper flow a more rapid sheet drawing rate is permissible without exceeding the capacity of the tank for producing properly refined glass. There will be less necessity for heating up the lower strata of glass in draw-pot 3, and by increasing the size of surface coolers 22 adjacent the sheet source, the sheet 1 may be drawn from the pot at a much more rapid rate and the production and efficiency of the machine correspondingly increased.

It will thus be seen that in operation this improved form of tank construction has the double advantage of conserving heat, and at the same time delivering to the glass working machine a larger volume of homogeneous molten metal. This construction also allows the tank to be built of tank blocks of a more convenient and economical size, and blocks which may be burnt harder and are less easily destroyed by the heat, and chemical action of the molten glass.

Claims:

1. In glass working apparatus, a tank for the molten glass, comprising an inner wall of refractory tank-blocks, an intermediate wall of fire-brick, and an outer wall of insulating material.

2. In glass working apparatus, a tank for the molten glass, comprising an inner wall of refractory tank-blocks, an intermediate wall of fire-brick, and an outer wall of insulating brick.

3. A wall for a glass tank, comprising an inner glass-holding wall of refractory tank-blocks, a plurality of layers of fire-brick laid against the outer wall of the blocks, and an outer wall of insulating material.

4. A wall for a glass tank, comprising an inner glass-holding wall of refractory tank-blocks, a plurality of layers of fire-brick laid against the outer wall of the blocks, and an outer wall of insulating brick.

5. A wall for a glass tank formed of several distinct layers built in contact with one another, comprising an inner wall of refractory tank-blocks, a plurality of rows of fire-brick, a wall of insulating material, and an outer metallic plate.

6. In glass working apparatus, a furnace comprising a tank and a heating chamber thereabove, both formed of refractory material, a wall of fire-brick immediately surrounding the refractory tank-wall, and an outer wall of insulating material enclosing both the tank and heating chamber.

Signed at Toledo, in the county of Lucas and State of Ohio, this 26th day of March, 1924.

WILLIAM K. BROWNLEE.